US012608596B2

(12) United States Patent
Du et al.

(10) Patent No.: US 12,608,596 B2
(45) Date of Patent: Apr. 21, 2026

(54) COMPUTER VISION MODELS USING GLOBAL AND LOCAL INFORMATION

(71) Applicant: Google LLC, Mountain View, CA (US)

(72) Inventors: Ruofei Du, San Francisco, CA (US); Yinda Zhang, Daly City, CA (US); Weihao Zeng, Taichung city (TW)

(73) Assignee: Google LLC, Mountain View, CA (US)

( * ) Notice: Subject to any disclaimer, the term of this patent is extended or adjusted under 35 U.S.C. 154(b) by 323 days.

(21) Appl. No.: 18/270,685

(22) PCT Filed: Mar. 31, 2021

(86) PCT No.: PCT/US2021/025044
§ 371 (c)(1),
(2) Date: Jun. 30, 2023

(87) PCT Pub. No.: WO2022/211794
PCT Pub. Date: Oct. 6, 2022

(65) Prior Publication Data
US 2024/0062046 A1     Feb. 22, 2024

(51) Int. Cl.
*G06N 3/0464* (2023.01)
*G06N 3/084* (2023.01)
(Continued)

(52) U.S. Cl.
CPC ........... *G06N 3/0464* (2023.01); *G06N 3/084* (2013.01); *G06V 10/42* (2022.01); *G06V 10/44* (2022.01); *G06V 10/82* (2022.01)

(58) Field of Classification Search
CPC ...... G06V 10/806; G06V 10/761; G06F 3/06; G06F 3/16; G06T 7/194; H04N 5/265;
(Continued)

(56) References Cited

U.S. PATENT DOCUMENTS 9,613,450 B2 *    4/2017    Wang ...................... G10L 21/10
9,730,643 B2 *    8/2017    Georgescu ........... A61B 5/7267
(Continued)

FOREIGN PATENT DOCUMENTS

WO    WO-2017106998 A1 *    6/2017    ........... G06N 3/0464

OTHER PUBLICATIONS

Aadil et al., "Improving super resolution methods via incremental residual learning," Paper, Presented at 2019 IEEE International Conference on Image Processing, Taipei, Taiwan, Sep. 22-25, 2019, pp. 2836-2840.
(Continued)

*Primary Examiner* — Mia M Thomas
(74) *Attorney, Agent, or Firm* — Fish & Richardson P.C.

(57)          ABSTRACT

A system including a computer vision model configured to perform a machine learning task is described. The computer vision model includes multiple wrapped convolutional layers, in which each wrapped convolutional layer includes a respective convolutional layer configured to receive, for each time step of multiple time steps, a layer input and to process the layer input to generate an initial output for the current time step, and a respective note-taking module configured to receive the initial output and to process the initial output to generate a feature vector for the current time step, the feature vector representing local information of the wrapped convolutional layer. The model includes a summarization module configured to receive the feature vectors and to process the feature vectors to generate a revision vector for the current time step, the revision vector representing global information of the plurality of wrapped convolutional layers.

17 Claims, 3 Drawing Sheets

(51) Int. Cl.
     *G06V 10/42*     (2022.01)
     *G06V 10/44*     (2022.01)
     *G06V 10/82*     (2022.01)
(58) Field of Classification Search
     CPC ...... H04N 23/60; H04N 5/2624; H04N 23/64;
                                               H04N 23/951
     See application file for complete search history.

(56)                    References Cited

U.S. PATENT DOCUMENTS

| | | | | |
|---|---|---|---|---|
| 10,424,087 | B2 * | 9/2019 | Risser | G06T 11/00 |
| 10,635,951 | B1 * | 4/2020 | Liu | G06V 30/19173 |
| 11,216,656 | B1 * | 1/2022 | Zia | G06N 3/04 |
| 11,651,192 | B2 * | 5/2023 | Gabriel | G06N 3/045 |
| | | | | 706/20 |
| 2017/0147544 | A1 * | 5/2017 | Modani | G06N 5/022 |
| 2018/0075343 | A1 * | 3/2018 | van den Oord | G06F 40/44 |
| 2018/0137417 | A1 * | 5/2018 | Theodorakopoulos | G06N 3/04 |
| 2018/0225519 | A1 * | 8/2018 | Chen | G06V 20/47 |
| 2018/0268284 | A1 * | 9/2018 | Ren | G06N 3/045 |
| 2019/0171926 | A1 * | 6/2019 | Chen | G06N 3/0464 |
| 2019/0258671 | A1 * | 8/2019 | Bou | G06F 16/7867 |
| 2019/0327103 | A1 * | 10/2019 | Niekrasz | G10L 15/26 |
| 2020/0380027 | A1 * | 12/2020 | Aggarwal | G06F 16/538 |
| 2021/0201045 | A1 * | 7/2021 | Iyer | H04N 21/8547 |
| 2021/0201129 | A1 * | 7/2021 | Schmude | G06N 3/08 |
| 2021/0232943 | A1 * | 7/2021 | Abishek Kumar | G06F 40/284 |
| 2021/0303796 | A1 * | 9/2021 | Elsahar | G06N 3/08 |
| 2022/0012365 | A1 * | 1/2022 | Garg | G06F 16/56 |
| 2022/0300819 | A1 * | 9/2022 | Ren | G06N 3/082 |
| 2023/0376677 | A1 * | 11/2023 | Choubey | G06N 3/045 |
| 2024/0036932 | A1 * | 2/2024 | Croxford | G06T 15/005 |
| 2024/0160837 | A1 * | 5/2024 | Agarwal | G06F 40/166 |
| 2024/0202461 | A1 * | 6/2024 | Pagnoni | G06F 16/345 |
| 2024/0242022 | A1 * | 7/2024 | Yee | G06F 40/174 |
| 2025/0022107 | A1 * | 1/2025 | Qian | G06T 5/30 |

OTHER PUBLICATIONS

Agustsson et al., "NTIRE 2017 challenge on single image super-resolution: Dataset and study," Paper, Presented at the IEEE Conference on Computer Vision and Pattern Recognition Workshops, Honolulu HI, Jul. 21-26, 2017, pp. 1122-1131.

Bello et al., "Attention augmented convolutional networks," Paper, Presented at 2019 IEEE/CVF Conference on Computer Vision and Pattern Recognition, Seoul, South Korea, Oct. 27-Nov. 2, 2019, pp. 3286-3295.

Bevilacqua et al., "Low-complexity single-image super-resolution based on nonnegative neighbor embedding," Paper, Presented at Proceedings of the British Machine Vision Conference, Surrey, United Kingdom, Sep. 3-7, 2012, 10 pages.

Cabon et al., "Virtual KITTI 2," CoRR, Submitted on Jan. 29, 2020, arXiv:2001.10773v1, 11 pages.

Carreira et al., "Human Pose Estimation with Iterative Error Feedback," Paper, Presented at Proceedings of the IEEE Conference on Computer Vision and Pattern Recognition, Las Vegas, NV, Jun. 27-30, 2016, pp. 4733-4742.

Chen et al., "Dynamic convolution: attention over convolution kernels," Paper, Presented at 2020 IEEE Conference on Computer Vision and Pattern Recognition, Seattle, WA, Jun. 13-19, 2020, pp. 11030-11039.

Chen et al., "Facilitating English-language reading performance by a digital reading annotation system with self-regulated learning mechanisms," Journal of Educational Technology & Society, Jan. 2014, 17(1): 102-114.

Cho et al., "Learning phrase representations using RNN encoder-decoder for statistical machine translation," CoRR, Submitted on Sep. 3, 2014, arXiv:1406.1078v3, 15 pages.

Cho et al., "On the properties of neural machine translation: Encoder-decoder approaches," CoRR, Submitted on Oct. 7, 2014, arXiv:1409.1259v2, 9 pages.

Eigen et al., "Depth map prediction from a single image using a multi-scale deep network," Paper, Presented at 28th Conference on Neural Information Processing Systems, Montreal, Canada, Dec. 8-13, 2014; Advances in Neural Information Processing Systems 27, Dec. 2014, 9 pages.

Fu et al., "Look closer to see better: recurrent attention convolutional neural network for fine-grained image recognition," Paper, Presented at 2017 IEEE Conference on Computer Vision and Pattern Recognition, Honolulu, HI, Jul. 21-26, 2017, pp. 4438-4446.

Godard et al., "Digging into self-supervised monocular depth estimation," Paper, Presented at Proceedings of the 2019 IEEE International Conference on Computer Vision, Seoul, South Korea, Oct. 27-Nov. 2, 2019, pp. 3828-3838.

Gu et al., "Blind super-resolution with iterative kernel correction," Paper, Presented at Proceedings of the 2019 IEEE Conference on Computer Vision and Pattern Recognition, Long Beach, CA, Jun. 15-20, 2019, pp. 1604-1613.

Gu et al., "Recent advances in convolutional neural networks," CoRR, Published May 2018, Submitted on Oct. 19, 2017, arXiv:1512.07108v6; Pattern Recognition, May 2018, 77(c):1-38.

Han et al., "Image super-resolution via dual-state recurrent networks," Paper, Presented at Proceedings of the IEEE Conference on Computer Vision and Pattern Recognition, Salt Lake City, UT, Jun. 18-23, 2018, pp. 1654-1663.

He et al., "Deep residual learning for image recognition," Paper, Presented at Proceedings of the 2016 IEEE Conference on Computer Vision and Pattern Recognition, Las Vegas, NV, Jun. 27-30, 2016, pp. 770-778.

Huang et al., "Arbitrary style transfer in real-time with adaptive instance normalization," Paper, Presented at Proceedings of the 2017 IEEE International Conference on Computer Vision, Venice, Italy, Oct. 22-29, 2017, pp. 1501-1510.

Huang et al., "Single image super-resolution from transformed self-exemplars," Paper, Presented at Proceedings of the IEEE Conference on Computer Vision and Pattern Recognition, Boston, MA, Jun. 7-12, 2015, pp. 5197-5206.

International Preliminary Report on Patentability in International Appln. No. PCT/US2021/025044, mailed Oct. 12, 2023, 10 pages.

International Search Report and Written Opinion in International Appln. No. PCT/US2021/025044, mailed Dec. 22, 2021, 16 pages.

Islam et al., "Gated feedback refinement network for dense image labeling," Paper, Presented at Proceedings of the IEEE Conference on Computer Vision and Pattern Recognition, Honolulu HI, Jul. 21-26, 2017, pp. 3751-3759.

Johnson et al., "Perceptual losses for real-time style transfer and super-resolution," Paper, Presented at European Conference on Computer Vision, Amsterdam, Netherlands, Oct. 11-14, 2016; Computer Vision, Sep. 17, 2016, 9906:694-711.

Karras et al., "A style-based generator architecture for generative adversarial networks," Paper, Presented at Proceedings of the 2019 IEEE Conference on Computer Vision and Pattern Recognition, Long Beach, CA, Jun. 15-20, 2019, pp. 4401-4410.

Karras et al., "Analyzing and improving the image quality of stylegan," Paper, Presented at Proceedings of the 2020 IEEE Conference on Computer Vision and Pattern Recognition, Seattle, WA, Jun. 13-19, 2020, pp. 8110-8119.

Kim et al., "Deeply-recursive convolutional network for image super-resolution," Paper, Presented at Proceedings of the 2016 IEEE Conference on Computer Vision and Pattern Recognition, Las Vegas, NV, Jun. 27-30, 2016, pp. 1637-1645.

Kingma et al., "Adam: A method for stochastic optimization," CoRR, Submitted on Dec. 22, 2014, arXiv:1412.6980v1, 9 pages.

Krizhevsky et al., "Imagenet classification with deep convolutional neural networks," Communications of the ACM, May 2017, 60(6):84-90.

Li et al., "DeepIM: Deep iterative matching for 6d pose estimation," Paper, Presented at Proceedings of the 2018 European Conference on Computer Vision, Munich, Germany, Sep. 8-14, 2018; Computer Vision, Sep. 8, 2018, 16 pages.

Li et al., "Feedback network for image super-resolution," Paper, Presented at Proceedings of the 2019 IEEE Conference on Computer Vision and Pattern Recognition, Long Beach, CA, Jun. 15-20, 2019, pp. 3867-3876.

(56)                References Cited

OTHER PUBLICATIONS

Li et al., "Gated multiple feedback network for image super-resolution," CoRR, Submitted on Jul. 10, 2019, arXiv:1907. 04253v2, 17 pages.

Lin et al., "Microsoft COCO: Common objects in context," 2014 European Conference on Computer Vision, Zurich, Switzerland, Sep. 6-12, 2014; CoRR, Submitted on Feb. 21, 2015, arXiv:1405. 0312v3, 15 pages.

Liu et al., "Iterative Network for Image Super Resolution," IEEE Transactions on Multimedia, May 10, 2021, 24:2259-2272.

Long et al., "Fully convolutional networks for semantic segmentation," Paper, Presented at Proceedings of the 2015 IEEE Conference on Computer Vision and Pattern Recognition, Boston, MA, Jun. 7-12, 2015, pp. 3431-3440.

Martin et al., "A database of human segmented natural images and its application to evaluating segmentation algorithms and measuring ecological statistics," Paper, Presented at Proceedings Eighth IEEE International Conference on Computer Vision, Vancouver, Canada, Jul. 7-14, 2001, pp. 416-423.

Matsui et al., "Sketch-based manga retrieval using manga109 dataset," Multimedia Tools and Applications, Nov. 9, 2016, 76(20):21811-21838.

Simonyan et al., "Very deep convolutional networks for large-scale image recognition," CoRR, Submitted on Dec. 23, 2014, arXiv:1409. 1556v5, 13 pages.

Slotte et al., "Review and process effects of spontaneous note-taking on text comprehension," Contemporary Educational Psychology, 1999, 24(1):1-20.

Su et al., "Effects of annotations and homework on learning achievement: An empirical study of scratch programming pedagogy," Journal of Educational Technology & Society, Feb. 2015, 18(4):331-343.

Sun et al., "Distilling with residual network for single image super resolution," Paper, Presented at 2019 IEEE International Conference on Multimedia and Expo, Shanghai, China, Jul. 8-12, 2019, pp. 1180-1185.

Wang et al., "Anytime stereo image depth estimation on mobile devices," Paper, Presented at 2019 International Conference on Robotics and Automation, Montreal, Canada, May 20-24, 2019, pp. 5893-5900.

Wang et al., "Deep learning for image super-resolution: A survey," IEEE Transactions on Pattern Analysis and Machine Intelligence, Mar. 23, 2020, 43(10):3365-3387.

Wang et al., "Densefusion: 6d object pose estimation by iterative dense fusion," Paper, Presented at Proceedings of the IEEE Conference on Computer Vision and Pattern Recognition, Long Beach, CA, Jun. 15-20, 2019, pp. 3343-3352.

Wei et al., "Network iterative learning for dynamic deep neural networks via morphism," Rejected Paper, submitted for review for the 2018 International Conference on Learning Representations, Vancouver, Canada, Apr. 30 - May 3, 2018, 13 pages.

Yao et al., "Recurrent MVSNet for high-resolution multiview stereo depth inference," Paper, Presented at Proceedings of the 2019 IEEE Conference on Computer Vision and Pattern Recognition, Long Beach, CA, Jun. 15-20, 2019, pp. 5525-5534.

Zamir et al., "Feedback networks," Paper, Presented at Proceedings of the 2017 IEEE Conference on Computer Vision and Pattern Recognition, Honolulu, HI, Jul. 21-26, 2017, pp. 1308-1317.

Zeyde et al., "On Single Image Scale-Up Using Sparse-Representations," Paper, Presented at International Conference on Curves and Surfaces, Avignon, France, Jun. 24-30, 2010, pp. 711-730.

Zhang et al., "Canet: Class-agnostic segmentation networks with iterative refinement and attentive few-shot learning," Paper, Presented at Proceedings of the 2019 IEEE Conference on Computer Vision and Pattern Recognition, Long Beach, CA, Jun. 15- 20, 2019, pp. 5217-5226.

Office Action in European Appln. No. 21720628.3, mailed on Apr. 4, 2025, 9 pages.

* cited by examiner

300

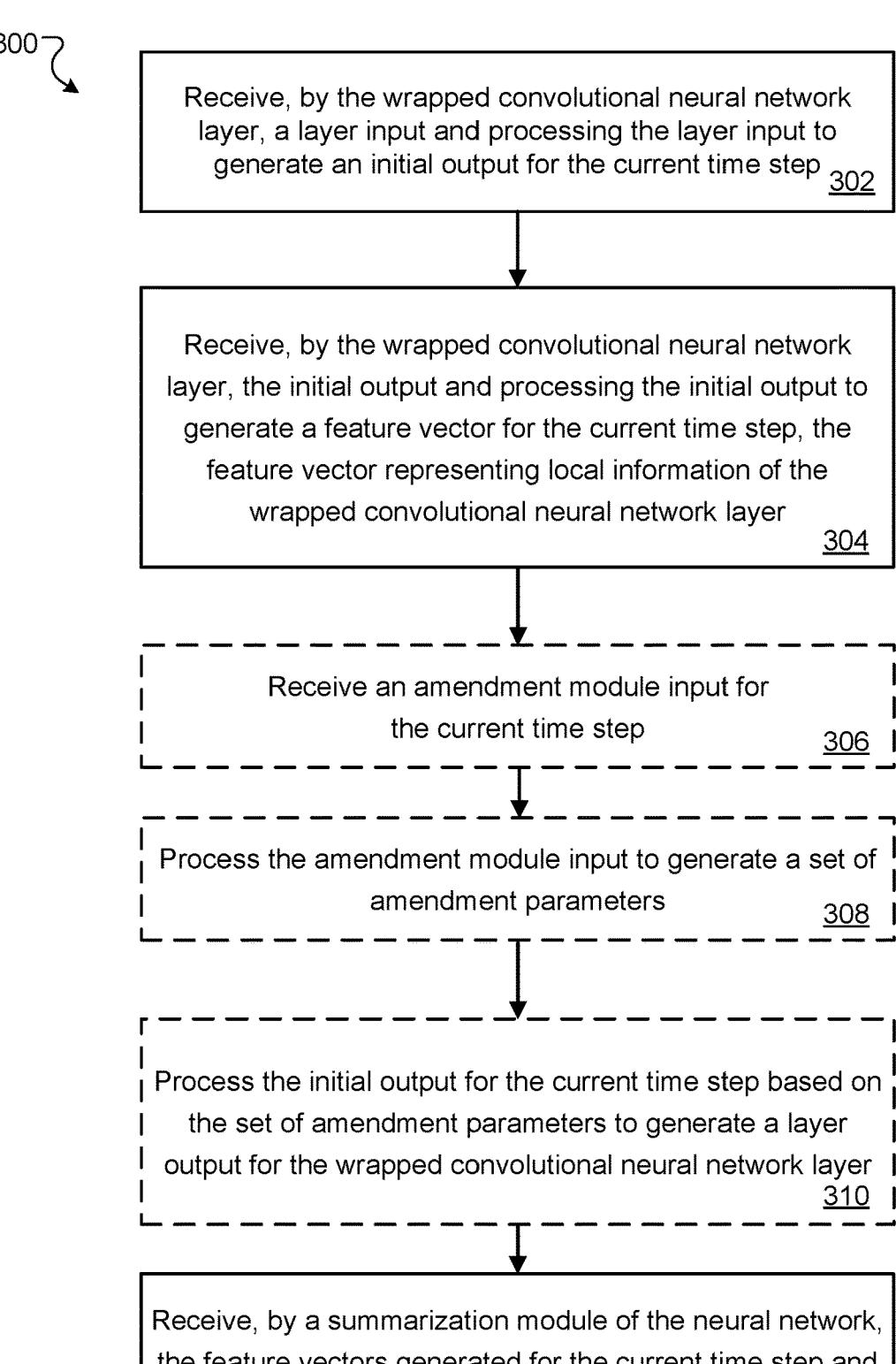

Receive, by the wrapped convolutional neural network layer, a layer input and processing the layer input to generate an initial output for the current time step 302

Receive, by the wrapped convolutional neural network layer, the initial output and processing the initial output to generate a feature vector for the current time step, the feature vector representing local information of the wrapped convolutional neural network layer 304

Receive an amendment module input for the current time step 306

Process the amendment module input to generate a set of amendment parameters 308

Process the initial output for the current time step based on the set of amendment parameters to generate a layer output for the wrapped convolutional neural network layer 310

Receive, by a summarization module of the neural network, the feature vectors generated for the current time step and to processing the feature vectors to generate a revision vector for the current time step 312

FIG. 3

COMPUTER VISION MODELS USING GLOBAL AND LOCAL INFORMATION

CROSS-REFERENCE TO RELATED APPLICATIONS

This application is a National Stage Application under 35 U.S.C. § 371 and claims the benefit of International Application No. PCT/US2021/025044, filed Mar. 31, 2021, the entirety of which is incorporated herein by reference.

BACKGROUND

This specification relates to a neural network system for implementing a computer vision model.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

Examples of neural networks include convolutional neural networks. Convolutional neural networks generally include at least two kinds of neural network layers, convolutional neural network layers and fully-connected neural network layers. Convolutional neural network layers have sparse connectivity, with each node in a convolutional layer receiving input from only a subset of the nodes in the next lowest neural network layer. Some convolutional neural network layers have nodes that share weights with other nodes in the layer. Nodes in fully-connected layers, however, receive input from each node in the next lowest neural network layer.

SUMMARY

This specification describes a neural network system implemented as computer programs on one or more computers in one or more locations that implements a computer vision neural network that includes multiple wrapped convolutional neural network layers.

In general, one innovative aspect of the subject matter described in this specification can be embodied in a system that includes one or more computers and one or more storage devices storing instructions that, when executed by the one or more computers, cause the one or more computers to implement a neural network that is configured to perform a machine learning task by receiving an input image and processing the input image to generate a network output and that includes a plurality of wrapped convolutional neural network layers. Each wrapped convolutional neural network layer of the plurality of wrapped convolutional neural network layers includes: a respective convolutional neural network layer configured to receive, for each time step of a plurality of time steps, a layer input and to process the layer input to generate an initial output for the current time step, and a respective note-taking module configured to receive the initial output and to process the initial output to generate a feature vector for the current time step, wherein the feature vector represents local information of the wrapped convolutional neural network layer. The neural network includes a summarization module configured to receive the feature vectors generated by the respective note-taking modules for the current time step and to process the feature vectors to generate a revision vector for the current time step. The revision vector represents global information of the plurality of wrapped convolutional neural network layers.

Other embodiments of this aspect include corresponding methods, apparatus, and computer programs, configured to perform the actions of the methods, encoded on computer storage devices.

The subject matter described in this specification can be implemented in particular embodiments so as to realize one or more of the following advantages.

Iterative improving methods refer to neural network architectures that iteratively improve on the same input on a task. However, current iterative improving methods such as the feedback mechanism and recurrent neural network (RNN) suffer from (i) weak generalization ability, (ii) lacking the ability to use both global and local information, and (iii) lacking explicit control on local features. Existing iterative improving methods are specific to a task and do not generalize to different network architectures nor tasks. This greatly hinders the ability to develop iterative improving methods across different tasks. Some methods use properties of specific network structures and thus restrict the ability to improve and may require additional parameters. Furthermore, most current iterative improving methods use RNN as the mean to implement iterativeness. This, by design, lacks the ability to use both global and local information.

The techniques described in this specification allow or help computer vision neural networks to iteratively improve by employing a framework that includes three sub-modules: a note-taking module, an amendment module, and a summarization module. The framework allows for replacement of each of two or more convolutional neural network layers in an existing neural network with a respective wrapped convolutional neural network (CNN) layer (or, alternatively, the respective wrapped CNN layer includes the convolutional neural network layer in the existing neural network and additional elements as described below). Each wrapped CNN layer in the resulting neural network has a respective note-taking module and a respective amendment module, while the summarization module is shared among all wrapped CNN layers. Generally, the note-taking module generates a "note" which is a feature vector representing local information, from output of each convolutional layer; the summarization module takes all the notes and outputs a revision vector representing global information of all of the wrapped CNN layers; and the amendment module takes the revision vector and the notes to generate parameters for modifying outputs of convolutional layers. By using the described techniques, the resulting neural network is able to leverage both local and global information and has the ability to explicitly modify the outputs of convolutional layers using both local and global information, thereby effectively and iteratively improving its performance (e.g., improving accuracy or quality of network outputs) on computer vision tasks such as super resolution, depth estimation, sematic segmentation, style transfer, image colorization, optical character recognition, image classification and object detection.

Therefore, in contrast to existing iterative improving methods, the described framework allows computer vision neural networks to (i) efficiently generate both local and global information, (ii) efficiently distribute/utilize both local and global information to iteratively improve, (iii) generate outputs that have significantly better accuracy/higher quality than those generated by conventional neural networks that use conventional convolutions.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for processing layer inputs of a plurality of wrapped CNN layers of a neural network to generate corresponding layer outputs of the plurality of wrapped CNN layers.

Like reference numbers and designations in the various drawings indicate like elements.

DETAILED DESCRIPTION

Figure 1:
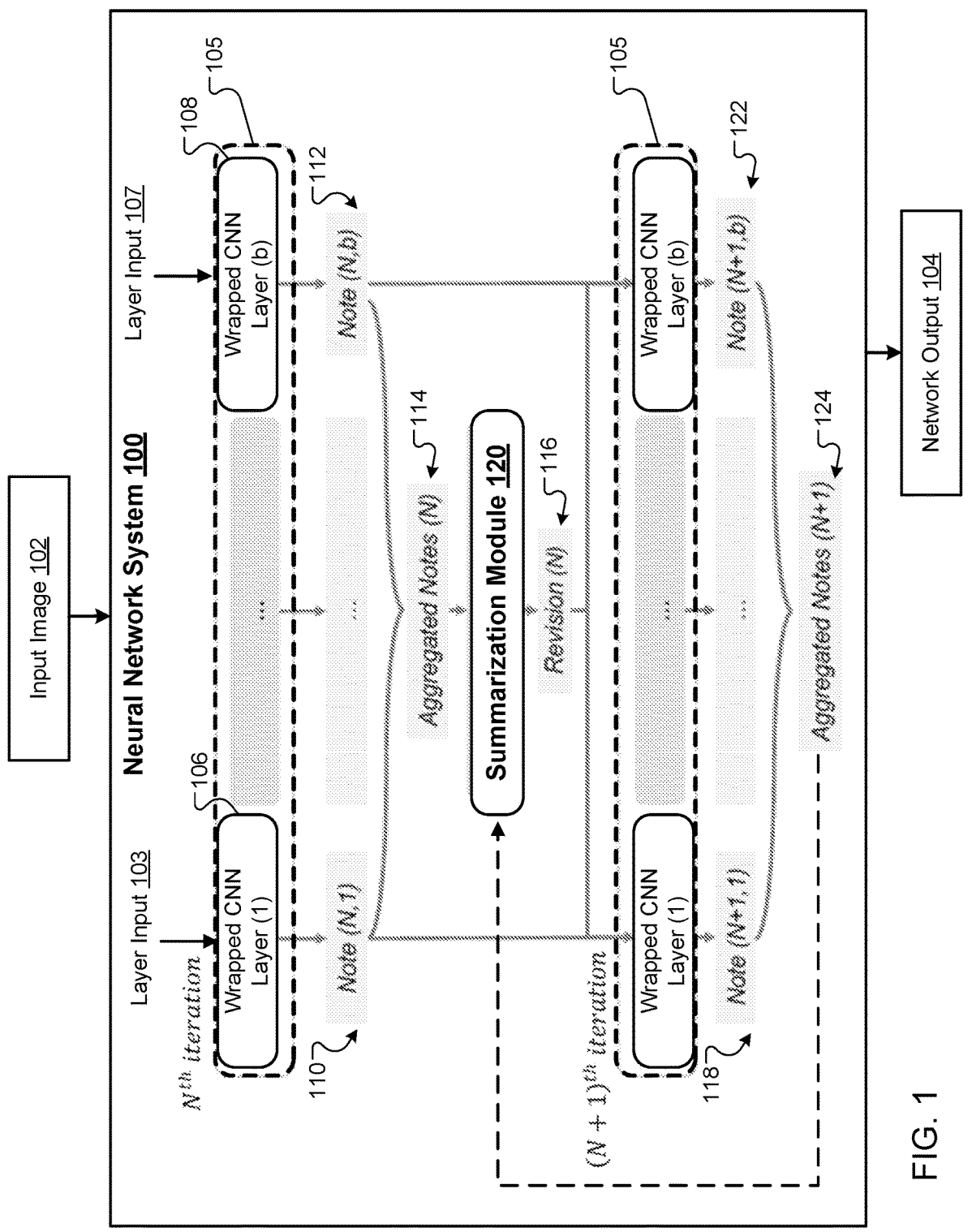
FIG. 1 shows an example neural network system including a plurality of wrapped convolutional neural network layers and a summarization module.

This specification describes a neural network system implemented as computer programs on one or more computers in one or more locations that implement a computer vision neural network that includes a summarization module and multiple wrapped convolutional neural network layers.

A wrapped convolutional neural network layer (or a "wrapped CNN layer") is a "plug-in" module that can be used to replace a convolutional neural network layer (or "CNN layer") (or, alternatively, the wrapped CNN layer includes the CNN layer and additional elements described below) in a conventional computer vision neural network without changing the overall architecture of the conventional computer vision neural network in order to obtain better performance in computer vision tasks such as super resolution, depth estimation, sematic segmentation, style transfer, image colorization, optical character recognition, image classification and object detection. The conventional computer vision neural network can be a convolutional neural network or any other type of neural network, e.g., Generative Adversarial Network (GAN).

Generally, the computer vision neural network can be configured to receive input image data and to generate any kind of output based on the input image, i.e., can be configured to perform any kind of image processing task. For example, for a super resolution task, the computer vision neural network is configured to receive an input image having a low resolution and to upscale it to generate an output image having the same content but with a high resolution. As another example, for a depth estimation task, the computer vision neural network is configured to estimate the depth of a given input image (e.g., a two dimensional image). As another example, for a sematic segmentation task, the computer vision neural network is configured to receive an input image and to generate a segmentation mask that clusters parts of the input image that belong to the same object class together. As yet another example, for a style transfer task, the computer vision neural network is configured to generate, from a content image and a style image, a stylized image (i.e., a pastiche image) whose content is similar to that of the content image but whose style is similar to that of the style image. As another example, for an image colorization task, the computer vision neural network is configured to receive a grayscale image and to transform the grayscale image into a color image. As another example, for an optical character recognition (OCR) task, the computer vision neural network is configured to convert an image of text (e.g., an image of typed, handwritten or printed text) into machine-encoded text (i.e., text that is editable or searchable). As another example, for an image classification or recognition task, the output generated by the computer vision neural network for a given image may be scores for each of a set of object categories, with each score representing the likelihood that the image contains an image of an object belonging to the category. As another example, for an object detection task, the output generated by the computer vision neural network can identify a location, a size, or both, of an object of interest in the input image.

By using the described techniques, the resulting neural network is able to better leverage both local and global information and has the ability to explicitly modify the outputs of convolutional layers using both local and global information, thereby effectively and iteratively improving its performance on computer vision tasks.

Generally, local information includes information that represents features generated by a specific neural network layer (and optionally, information that represents features generated by one or more other neural network layers proximate to the specific neural network layer). Global information includes information that represents features generated by (or across) a plurality of neural network layers.

Local information and global information may be defined based on how much exposure that each type of information has to features/outputs in a neural network at different "depth" levels (a feature is considered deeper when it goes through more network layers). Local features are generated in deeper layers in "depth." Global features are generated from lower layers and more spread-out in terms of depth (e.g., global features may be generated across dozens or hundreds of network layers).

For example, outputs/features of a deep neural network generated by neural network layers at different depths can be represented as points located at positions corresponding to their respective depths in the neural network. For example, the output of the first layer is at location 1, and the output of the second layer is at location 2. Local information is information conditioned/generated on a point or a few points that are close together (i.e., few of them and near in distance), while global information is information conditioned/generated on points spread out (i.e., greater in number and more spread-out in distance).

In some implementations, local information may carry information that is more specific to a task (e.g., information that is related to solving/performing a sub-task of the task) while global information may carry information across the entire process of solving/performing the task. For example, in a neural network that is configured to perform an image classification task (e.g., to classify an animal captured in an image into one of a plurality of animal categories), local information may include information on what kind of cat the input is, e.g., Sphynx cat, while global information may contain information on what kind of animal the input is, e.g., dog.

FIG. 1 illustrates an example neural network system that implements a computer vision neural network that has multiple wrapped CNN layers and a summarization module. The neural network system 100 is an example of a system implemented as computer programs on one or more computers in one or more locations, in which the systems, components, and techniques described below can be implemented.

The neural network system 100 implements a computer vision neural network 105 that includes a plurality of wrapped CNN layers, e.g., wrapped CNN layer 106, . . . , wrapped CNN layer 108. Although only wrapped CNN layers are illustrated in FIG. 1, the computer vision neural network 105 can include other types of neural network layers, e.g., 1×1 convolutions, other convolutional layers, and fully-connected layers. In addition, FIG. 1 shows. In the vertical direction, multiple instances of the same computer vision neural network 105 to illustrate operations of the neural network 105 at multiple time steps (i.e., multiple iterations such as $N^{th}$ iteration and $(N+1)^{th}$ iteration).

The computer vision neural network 105 can be generated from an existing computer vision neural network by replacing all, or a subset, of the convolutional neural network layers in the existing computer vision neural network with a wrapped CNN layer. Each of the plurality of wrapped CNN layers in the neural network 105 includes a respective convolutional neural network layer, a respective note taking module, and a respective amendment module. The architecture and operation of a wrapped CNN layer will be described in more detail below with reference to FIG. 2. The respective convolutional neural network layer in each wrapped CNN layer can be an existing convolutional neural network layer in the existing computer vision neural network. The computer vision neural network 105 further includes a summarization module that is shared among the plurality of wrapped CNN layers. It is noted that, to illustrate the operations of the plurality of wrapped CNN layers and the summarization module 120 at each time step, FIG. 1 shows that the summarization module 120 is outside of the neural network 105, however, it should be understood that the summarization module 120 is a part of the neural network 105 and is shared among the plurality of wrapped CNN layers.

Generally, the neural network 105 is configured to receive an input image 102 and to process the input image 102 to generate a network output 104. At each time step, each wrapped CNN layer is configured to receive a respective layer input and to generate a respective layer output for the wrapped CNN layer for the time step. The respective layer input can be, for example: (i) the input image 102, (ii) an input derived from the input image 102, (iii) an output of a preceding wrapped CNN layer in the plurality of wrapped CNN layers, or (iv) an output of another component of the neural network 105. The respective convolutional neural network layer of the wrapped CNN layer is configured to receive the layer input of the wrapped CNN layer and to process the layer input to generate an initial output for the current time step. The respective note-taking module of the wrapped CNN layer is configured to receive the initial output and to process the initial output to generate a feature vector (also referred to as a "note") for the current time step. The feature vector represents local information of the wrapped CNN layer. The feature vector of the described embodiment may be a one-dimensional (1D) feature vector.

At each time step, the summarization module of the computer vision neural network 105 is configured to receive the feature vectors generated by the note-taking modules of the plurality of wrapped CNN layers for the current time step. The summarization module may include a multi-layer perceptron (MLP) layer and may be configured to process the feature vectors to generate a revision vector for the current time step as follows:

$$\text{Revision(Notes)} = \text{MLP}([\text{note} \in \text{Notes}])$$

where [.] denotes concatenation. [note∈Notes] denotes a concatenated feature vector that is a concatenation of all feature vectors generated by all note-taking modules of the plurality of wrapped CNN layers. MLP( ) denotes the multi-layer perceptron layer that processes the concatenated feature vector to generate the revision vector, denoted as Revision(Notes). The revision vector of the described embodiment may be a one-dimensional (1D) feature vector. The revision vector represents global information of the plurality of wrapped CNN layers. The revision vector will be fed as input to the respective amendment module of each wrapped CNN layer at the next time step.

The respective amendment module of each wrapped CNN layer is configured to, for each time step after a first time step in the plurality of time steps: (i) receive an amendment module input for the current time step, (ii) process the amendment module input to generate a set of amendment parameters, and (iii) receive the initial output generated by the respective CNN layer for the current time step and process the initial output based on the set of amendment parameters to generate a layer output for the wrapped convolutional neural network layer. The amendment module input includes one or more of (i) a previous revision vector generated by the summarization module for a previous time step, (ii) a previous feature vector generated by the respective note-taking module of the wrapped convolutional neural network layer for the previous time step, or (iii) the feature vector generated by the respective note-taking module of the wrapped convolutional neural network layer for the current time step.

For the first time step when the previous revision vector and the previous feature vector are absent, the respective amendment module of each wrapped CNN layer passes the output of the respective CNN layer without modification. That means, for the first time step, the initial output generated by the respective CNN layer of each wrapped CNN layer is also the layer output of the wrapped CNN layer.

As illustrated in FIG. 1, at $N^{th}$ iteration, each of the plurality of the wrapped CNN layers processes its respective layer input to generate a respective feature vector (or a respective "note") that represents local information of the wrapped CNN layer. For instance, the wrapped CNN layer 106 is configured to receive the layer input 103 and process the layer input 103 to generate a feature vector 110 (or Note (N,1)). More specifically, as described above, the respective CNN layer (not shown) of the wrapped CNN layer 106 processes the layer input 103 to generate a respective initial input and the respective note-taking module (not shown) of the wrapped CNN layer 106 processes the respective initial input to generate the feature vector 110. Similarly, the wrapped CNN layer 108 is configured to receive the layer input 107 and process the layer input 107 to generate a feature vector 112 (or Note (N,b)). The summarization module 120 of the neural network 105 is configured to collect the feature vectors (e.g., aggregated notes 114) generated by the plurality of wrapped CNN layers and to process the feature vectors to generate a revision vector (e.g., the revision vector 116) for the $N^{th}$ iteration. The revision vector of the $N^{th}$ iteration, which represents the global information of the plurality of wrapped CNN layers, is then fed into each of the plurality of wrapped CNN layers at the next iteration, i.e., the $(N+1)^{th}$ iteration, in order to help improve performance of the computer vision neural network 105. At the $(N+1)^{th}$ iteration, each of the plurality of wrapped CNN layers generates a respective feature vector (e.g., feature vectors 118, . . . , 122). The summarization module 120 collects these feature vectors (e.g., aggregated notes 124) and to process the feature vectors to generate a revision vector for the next iteration. The process can repeat for an arbitrary number of iterations or until one or more criteria are satisfied. For example, the process can repeat until a predetermined number of iterations has been reached. As another example, the process can repeat until a predetermined level of performance (e.g., a predetermined level of accuracy) of the computer vision neural network 105 has been achieved. As another example, the process can repeat until a predetermined computational budget has been used.

The layer output of each wrapped CNN layer may be provided as input to the next wrapped CNN layer other components of the neural network 105 for further processing, or may be used to generate the network output 104 of the neural network system 100.

The computer vision neural network 105 may include one or more output layers that are configured to receive the output of the final wrapped CNN layer in the computer vision neural network 105. The one or more output layers are configured to process the output of the final wrapped CNN layer to generate the network output 104 of the neural network system 100.

Figure 2:
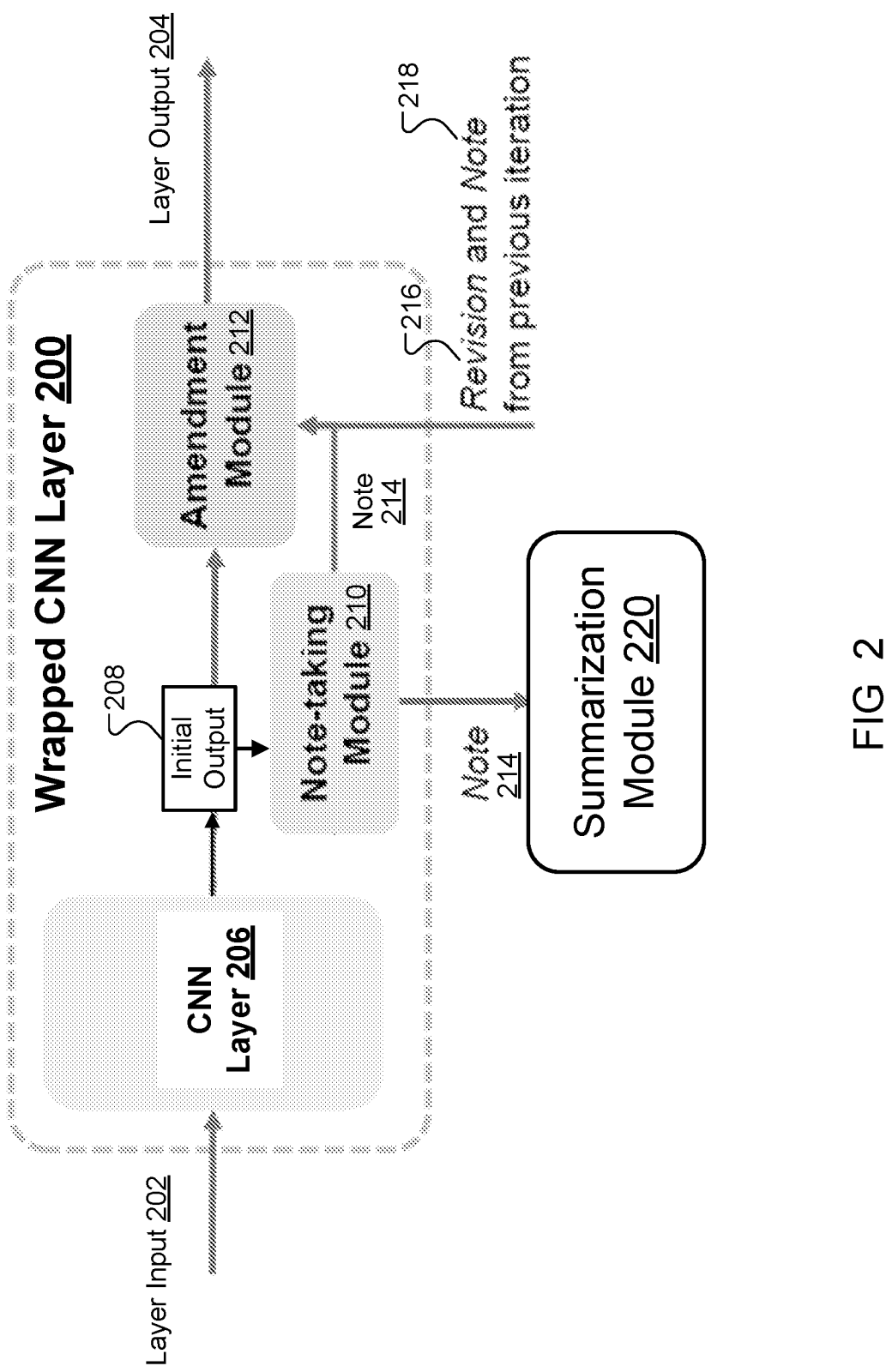
FIG. 2 illustrates an example architecture of a wrapped convolutional neural network layer.

FIG. 2 illustrates an example architecture of a wrapped convolutional neural network layer 200 and a summarization module 220 of a computer vision neural network. The wrapped CNN layer 200 includes a CNN layer 206, a note-taking module 210 and an amendment module 212.

At each time step of a plurality of time steps, the CNN layer 206 is configured to receive a layer input 202 and to process the layer input 202 to generate an initial output 208 for the current time step. The initial output 308 is a multi-dimensional vector (e.g., a three-dimensional (3D) vector) that represents features of the layer input 202.

The note-taking module 210 is configured to receive the initial output 208 and to process the initial output 208 to generate a feature vector 214 (or a note 214) for the current time step. The feature vector 214 represents local information of the wrapped convolutional neural network layer 200. As described in the description associated with FIG. 1, the feature vector 214 is provided to the summarization module 220 along with other feature vectors generated by the note-taking modules of other wrapped CNN layers of the neural network, so that the summarization module 220 can process all of the feature vectors to generate a revision vector that represents global information of the plurality of wrapped CNN layers of the computer vision neural network.

The note-taking module 210 includes a pooling layer and a multi-layer perceptron (MLP) layer. To generate the feature vector 214 for the current time step, the note-taking module 210 applies, using the pooling layer, a pooling operation to the initial output 308 to generate a second intermediate output. Because outputs of convolutional layers can be very large, the use of the pooling layer allows the note-taking module 210 to reduce the dimension of the initial output 308, thus extracting information from the initial output 308 efficiently. The note-taking module 210 then flattens the second intermediate output to generate a third intermediate output, e.g., by applying a flattening operation to the second intermediate output. The second intermediate output of the described embodiment may be a three-dimensional (3D) vector. The third intermediate output of the described embodiment may be a one-dimensional (1D) vector. The note-taking module 210 processes, using the MLP layer, the third intermediate output to generate the feature vector 214 for the current time step. The feature vector 214 may be a one-dimensional (1D) vector.

For example, the operations of the note-taking module 210 can be expressed as follows:

$$\text{Note}(x) = \text{MLP}(\text{flatten}(\text{pooling}(x)))$$

where x denotes the initial output 208 and Note(x) denotes the feature vector 214. Pooling( ) denotes the pooling layer. flatten( ) denotes the flattening operation that transforms the output of the pooling layer (which is a multi-dimensional vector) into a one-dimensional vector, e.g., by concatenating elements in the multi-dimensional vector to form the one-dimensional vector. A simplified example of a flattening operation is flattening a two-dimensional vector (or matrix) of [[1, 2],[3, 4]] to form a one-dimensional vector of [1, 2, 3, 4]. MLP( ) denotes the multi-layer perceptron layer.

In some implementations, if the initial output 208 has a large-channel dimension, the note-taking module 210 applies, using a pre-processing layer in the note-taking module 210, a pre-processing operation to the initial output 208 to reduce a channel dimension of the initial output 208 before pooling, as shown in the following equation:

$$\text{Note}(x) = \text{MLP}(\text{flatten}(\text{pooling}(pp(x)))),$$

where pp( ) denotes the pre-processing layer that applies a pre-processing operation to the initial output 208 (denoted as x). The pre-processing operation may be, for example, a 1×1 convolution.

In these implementations, the note-taking module 210 applies, using the pre-processing layer, the pre-processing operation to the initial output 208 to generate a first intermediate output and applies, using the pooling layer, the pooling operation to the first intermediate output to generate a second intermediate output. The note-taking module 210 flattens the second intermediate output to generate a third intermediate output, and processes, using the MLP layer, the third intermediate output to generate the feature vector 214 for the current time step.

The amendment module 212 is configured to receive an amendment module input (not shown) for the current time step and to process the amendment module input to generate a set of amendment parameters. The amendment module input may include one or more of: (i) a previous revision vector 216 generated by the summarization module 220 for a previous time step, (ii) a previous feature vector 218 generated by the note-taking module 210 of the wrapped CNN layer 200 for the previous time step, or (iii) the feature vector 214 generated by the respective note-taking module 210 of the wrapped CNN layer 200 for the current time step.

The amendment module 212 includes a multi-layer perceptron (MLP) layer. The amendment module 212 processes the amendment module input to generate the set of amendment parameters using the multi-layer perceptron (MLP) layer. The set of amendment parameters includes, for each channel of a plurality of channels of the initial output 208, a respective pair of control variables. That is, assuming that the initial output 208 has C channels, the set of amendment parameters includes C pairs of control variables. Each pair of control variables has a variance and bias (which are two scalars) to control the variance and bias of the corresponding channel of the initial output 208. The C pairs of variances and biases are generated as follows:

$$V_i, B_i = \text{Amendment}([\text{revision}_{t-1}, \text{note}_{t-1}, \text{note}_t])$$

where t denotes the current time step and Amendment( ) denotes the amendment module 212. [.] denotes concatenation. [revision$_{t-1}$, note$_t$], noted denotes a concatenation of all components in the amendment module input, where revision$_{t-1}$ denotes the previous revision vector 216 generated by the summarization module 220 for the time step t−1, note$_{t-1}$ denotes the previous feature vector 218 generated by the note-taking module 210 of the wrapped CNN layer 200 for the time step t−1, and note$_t$ denotes the feature vector 214 generated by the respective note-taking module 210 of the wrapped CNN layer 200 for the current time step t.

The amendment module 212 is configured to process the initial output 208 to generate the layer output 204 for the wrapped CNN layer 200 by scaling and shifting a variance and bias of each channel of the plurality of channels of the initial output 208 using the respective pair of control variables of the channel. In some implementations, the amendment module 212 is configured to apply instance normalization to the initial output 208 before scaling and shifting the variance and bias of each channel of the plurality of channels.

For example, the amendment module 212 can generate the layer output 204, denoted as $$Y_t',$$

follows:

$$Y_t' = (1 + V_t) \cdot InsNorm(Y_t) + B_t \qquad (*)$$

where $V_t$, $B_t$ denote the control variables. $Y_t$ denotes the initial output 208 generated by the CNN layer 206. InsNorm denotes instance normalization without learnable parameters. As noted above, applying instance normalization is optional. At the first time step, the amendment module 212 can be zero-initialized (i.e., by setting $V_t$ and $B_t$ of formulation (*) to zeros) such that it does not apply changes to the initial output 208 and instead outputs the initial output 208 as the layer output 204.

FIG. 3 is a flow diagram of an example process for processing layer inputs of a plurality of wrapped CNN layers of a neural network to generate corresponding layer outputs for the plurality of wrapped CNN layers. For convenience, the process 300 will be described as being performed by a system of one or more computers located in one or more locations. For example, a neural network system, e.g., the neural network system 100 of FIG. 1, appropriately programmed in accordance with this specification, can perform the process 300.

For each of the plurality of wrapped CNN layers of the neural network, the system performs steps 302-310 at each time step after the first time step of a plurality of time steps. For the first time step, the system does not perform step 306-310, and thus steps 306-310 are shown in phantom to indicate they are not performed for the first iteration.

The system receives, by the wrapped CNN layer, a layer input and processes the layer input to generate an initial output for the current time step (step 302). The system uses the respective convolutional neural network layer in the wrapped CNN layer to process the layer input to generate the initial output.

The system receives, by the wrapped CNN layer, the initial output and processes the initial output to generate a feature vector for the current time step (step 304). The feature vector represents local information of the wrapped CNN layer.

In particular, the system uses the respective note-taking module in the wrapped CNN layer to process the initial output to generate the feature vector. The respective note-taking module includes a pooling layer, a multi-layer perceptron (MLP) layer, and optionally, a pre-processing layer. The respective note-taking module is configured to apply, using a pooling layer, a pooling operation to the initial output to generate a second intermediate output, flatten the second intermediate output to generate a third intermediate output, and process, using the MLP layer, the third intermediate output to generate the feature vector for the current time step.

In some implementations, if the initial output has a large-channel dimension, the note-taking module applies, using the pre-processing layer, a pre-processing operation to the initial output to reduce a channel dimension of the initial output before pooling. In these implementations, the note-taking module applies, using the pre-processing layer, the pre-processing operation to the initial output to generate a first intermediate output and applies, using the pooling layer, the pooling operation to the first intermediate output to generate a second intermediate output. Applying the pre-processing operation to the initial output may include applying a 1×1 convolution to the initial output to reduce the channel dimension of the initial output. The note-taking module flattens the second intermediate output to generate a third intermediate output, and processes, using the MLP layer, the third intermediate output to generate the feature vector for the current time step.

The system receives an amendment module input for the current time step (step 306). The amendment module input includes one or more of (i) a previous revision vector generated by the summarization module for a previous time step, (ii) a previous feature vector generated by the wrapped convolutional neural network layer for the previous time step, or (iii) the feature vector generated by the wrapped convolutional neural network layer for the current time step, The system processes the amendment module input to generate a set of amendment parameters (step 308). The set of amendment parameters includes, for each channel of a plurality of channels of the initial output, a respective pair of control variables.

The system processes the initial output for the current time step based on the set of amendment parameters to generate a layer output for the wrapped convolutional neural network layer (step 310).

In particular, the system processes the initial output by using the respective amendment module of the wrapped CNN layer to scale and shift a variance and bias of each channel of a plurality of channels of the initial output using the respective pair of control variables of the channel. In some implementations, the respective amendment module is configured to apply instance normalization to the initial output before scaling and shifting the variance and bias of each channel of the plurality of channels.

As mentioned above, for the first time step when the previous revision vector and the previous feature vector are absent, the system does not perform step 306-310 and instead passes the output of the respective CNN layer of each wrapped CNN layer without modification. That means, for the first time step, the initial output generated by the respective CNN layer of each wrapped CNN layer is also the layer output of the wrapped CNN layer.

At each time step of the plurality of time steps, the system receives, by a summarization module of the neural network, the feature vectors generated for the current time step and processes the feature vectors to generate a revision vector for the current time step (step 312). The revision vector represents global information of the plurality of wrapped convolutional neural network layers.

In particular, the summarization module may include a multi-layer perception (MLP) layer. The summarization module is configured to concatenate the feature vectors generated by the respective note-taking modules of the plurality of wrapped CNN layers for the current time step to generate a concatenated feature vector. The summarization module processes the concatenated feature vector using the second MLP layer to generate the revision vector for the current time step.

The computer vision neural network described in this specification can be trained on training data using conventional machine learning techniques (e.g., backpropagation) to optimize an objective function that is appropriate for the task the computer vision neural network is configured to perform.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers. The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system comprising one or more computers and one or more storage devices storing instructions that, when executed by the one or more computers, cause the one or more computers to implement a neural network that is configured to perform a machine learning task by receiving an input image and processing the input image to generate a network output, the neural network comprising:

a plurality of wrapped convolutional neural network layers, wherein each wrapped convolutional neural network layer of the plurality of wrapped convolutional neural network layers comprises:

a respective convolutional neural network layer configured to receive, for each time step of a plurality of time steps, a layer input and to process the layer input to generate an initial output for the current time step, and a respective note-taking module configured to receive the initial output and to process the initial output to generate a feature vector for the current time step, wherein the feature vector represents local information of the wrapped convolutional neural network layer; and a summarization module configured to receive the feature vectors generated by the respective note-taking modules for the current time step and to process the feature vectors to generate a revision vector for the current time step, wherein the revision vector represents global information of the plurality of wrapped convolutional neural network layers;

wherein each wrapped convolutional neural network layer further comprises a respective amendment module configured to, for each time step after a first time step in the plurality of time steps:

receive an amendment module input for the current time step, the amendment module input comprising one or more of: (i) a previous revision vector generated by the summarization module for a previous time step, (ii) a previous feature vector generated by the respective note-taking module of the wrapped convolutional neural network layer for the previous time step, or iii) the feature vector generated by the respective note-taking module of the wrapped convolutional neural network layer for the current time step, process the amendment module input to generate a set of amendment parameters, and receive the initial output for the current time step and process the initial output based on the set of amendment parameters to generate a layer output for the wrapped convolutional neural network layer.

2. The system of claim 1, wherein the set of amendment parameters comprises, for each channel of a plurality of channels of the initial output, a respective pair of control variables, and wherein the respective amendment module is configured to process the initial output to generate the layer output by:

scaling and shifting a variance and bias of each channel of the plurality of channels of the initial output using the respective pair of control variables of the channel.

3. The system of claim 2, wherein the respective amendment module is further configured to apply instance normalization to the initial output before scaling and shifting the variance and bias of each channel of the plurality of channels.

4. The system of claim 1, wherein the feature vector is a one-dimensional (1D) vector.

5. The system of claim 1, wherein the neural network is a convolutional neural network.

6. The system of claim 1, wherein the layer input is one of the following: (i) the input image, (ii) an input derived from the input image, (iii) an output of a preceding wrapped convolutional neural network layer in the plurality of wrapped convolutional neural network layers, or (iv) an output of another component of the neural network.

7. A system comprising one or more computers and one or more storage devices storing instructions that, when executed by the one or more computers, cause the one or more computers to implement a neural network that is configured to perform a machine learning task by receiving an input image and processing the input image to generate a network output, the neural network comprising:

a plurality of wrapped convolutional neural network layers, wherein each wrapped convolutional neural network layer of the plurality of wrapped convolutional neural network layers comprises:

a respective convolutional neural network layer configured to receive, for each time step of a plurality of time steps, a layer input and to process the layer input to generate an initial output for the current time step, and a respective note-taking module configured to receive the initial output and to process the initial output to generate a feature vector for the current time step, wherein the feature vector represents local information of the wrapped convolutional neural network layer; and a summarization module configured to receive the feature vectors generated by the respective note-taking modules for the current time step and to process the feature vectors to generate a revision vector for the current time step, wherein the revision vector represents global information of the plurality of wrapped convolutional neural network layers;

wherein the respective note-taking module comprises a pre-processing layer, a pooling layer, and a multi-layer perceptron (MLP) layer, and wherein the respective note-taking module is configured to process the initial output to generate the feature vector for the current time step by:

applying, using the pre-processing layer, a pre-processing operation to the initial output to generate a first intermediate output, applying, using the pooling layer, a pooling operation to the first intermediate output to generate a second intermediate output, flattening the second intermediate output to generate a third intermediate output, and processing, using the MLP layer, the third intermediate output to generate the feature vector for the current time step.

8. The system of claim 7, wherein the pre-processing layer comprises a 1×1 convolutional neural network layer, and wherein applying the pre-processing operation to the initial output comprises applying a 1×1 convolution to the initial output to reduce a channel dimension of the initial output.

9. A system comprising one or more computers and one or more storage devices storing instructions that, when executed by the one or more computers, cause the one or more computers to implement a neural network that is configured to perform a machine learning task by receiving an input image and processing the input image to generate a network output, the neural network comprising:

a plurality of wrapped convolutional neural network layers, wherein each wrapped convolutional neural network layer of the plurality of wrapped convolutional neural network layers comprises:

a respective convolutional neural network layer configured to receive, for each time step of a plurality of time steps, a layer input and to process the layer input to generate an initial output for the current time step, and a respective note-taking module configured to receive the initial output and to process the initial output to generate a feature vector for the current time step, wherein the feature vector represents local information of the wrapped convolutional neural network layer; and a summarization module configured to receive the feature vectors generated by the respective note-taking modules for the current time step and to process the feature vectors to generate a revision vector for the current time step, wherein the revision vector represents global information of the plurality of wrapped convolutional neural network layers;

wherein the respective note-taking module comprises a pooling layer and a multi-layer perceptron (MLP) layer, and wherein the respective note-taking module is configured to process the initial output to generate the feature vector for the current time step by:

applying, using a pooling layer, a pooling operation to the initial output to generate a second intermediate output, flattening the second intermediate output to generate a third intermediate output, and processing, using the MLP layer, the third intermediate output to generate the feature vector for the current time step.

10. A system comprising one or more computers and one or more storage devices storing instructions that, when executed by the one or more computers, cause the one or more computers to implement a neural network that is configured to perform a machine learning task by receiving an input image and processing the input image to generate a network output, the neural network comprising:

a plurality of wrapped convolutional neural network layers, wherein each wrapped convolutional neural network layer of the plurality of wrapped convolutional neural network layers comprises:

a respective convolutional neural network layer configured to receive, for each time step of a plurality of time steps, a layer input and to process the layer input to generate an initial output for the current time step, and a respective note-taking module configured to receive the initial output and to process the initial output to generate a feature vector for the current time step, wherein the feature vector represents local information of the wrapped convolutional neural network layer; and a summarization module configured to receive the feature vectors generated by the respective note-taking modules for the current time step and to process the feature vectors to generate a revision vector for the current time step, wherein the revision vector represents global information of the plurality of wrapped convolutional neural network layers;

wherein the summarization module comprises a second multi-layer perception (MLP) layer and is configured to process the feature vectors to generate a revision vector for the current time step by:

concatenating the feature vectors generated by the respective note-taking modules for the current time step to generate a concatenated feature vector, and processing the concatenated feature vector using the second MLP layer to generate the revision vector for the current time step.

11. A system comprising one or more computers and one or more storage devices storing instructions that, when executed by the one or more computers, cause the one or more computers to implement a neural network that is configured to perform a machine learning task by receiving an input image and processing the input image to generate a network output, the neural network comprising:

a plurality of wrapped convolutional neural network layers, wherein each wrapped convolutional neural network layer of the plurality of wrapped convolutional neural network layers comprises:

a respective convolutional neural network layer configured to receive, for each time step of a plurality of time steps, a layer input and to process the layer input to generate an initial output for the current time step, and a respective note-taking module configured to receive the initial output and to process the initial output to generate a feature vector for the current time step, wherein the feature vector represents local information of the wrapped convolutional neural network layer; and a summarization module configured to receive the feature vectors generated by the respective note-taking modules for the current time step and to process the feature vectors to generate a revision vector for the current time step, wherein the revision vector represents global information of the plurality of wrapped convolutional neural network layers;

wherein the initial output is a three-dimensional (3D) vector.

12. A system comprising one or more computers and one or more storage devices storing instructions that, when executed by the one or more computers, cause the one or more computers to implement a neural network that is configured to perform a machine learning task by receiving an input image and processing the input image to generate a network output, the neural network comprising:

a plurality of wrapped convolutional neural network layers, wherein each wrapped convolutional neural network layer of the plurality of wrapped convolutional neural network layers comprises:

a respective convolutional neural network layer configured to receive, for each time step of a plurality of time steps, a layer input and to process the layer input to generate an initial output for the current time step, and a respective note-taking module configured to receive the initial output and to process the initial output to generate a feature vector for the current time step, wherein the feature vector represents local information of the wrapped convolutional neural network layer; and a summarization module configured to receive the feature vectors generated by the respective note-taking modules for the current time step and to process the feature vectors to generate a revision vector for the current time step, wherein the revision vector represents global information of the plurality of wrapped convolutional neural network layers;

wherein the revision vector is a one-dimensional (1D) vector.

13. A system comprising one or more computers and one or more storage devices storing instructions that, when executed by the one or more computers, cause the one or more computers to implement a neural network that is configured to perform a machine learning task by receiving an input image and processing the input image to generate a network output, the neural network comprising:

a plurality of wrapped convolutional neural network layers, wherein each wrapped convolutional neural network layer of the plurality of wrapped convolutional neural network layers comprises:

a respective convolutional neural network layer configured to receive, for each time step of a plurality of time steps, a layer input and to process the layer input to generate an initial output for the current time step, and a respective note-taking module configured to receive the initial output and to process the initial output to generate a feature vector for the current time step, wherein the feature vector represents local information of the wrapped convolutional neural network layer; and a summarization module configured to receive the feature vectors generated by the respective note-taking modules for the current time step and to process the feature vectors to generate a revision vector for the current time step, wherein the revision vector represents global information of the plurality of wrapped convolutional neural network layers;

wherein the neural network is a Generative Adversarial Network (GAN).

14. A system comprising one or more computers and one or more storage devices storing instructions that, when executed by the one or more computers, cause the one or more computers to implement a neural network that is configured to perform a machine learning task by receiving an input image and processing the input image to generate a network output, the neural network comprising:

a plurality of wrapped convolutional neural network layers, wherein each wrapped convolutional neural network layer of the plurality of wrapped convolutional neural network layers comprises:

a respective convolutional neural network layer configured to receive, for each time step of a plurality of time steps, a layer input and to process the layer input to generate an initial output for the current time step, and a respective note-taking module configured to receive the initial output and to process the initial output to generate a feature vector for the current time step, wherein the feature vector represents local information of the wrapped convolutional neural network layer; and a summarization module configured to receive the feature vectors generated by the respective note-taking modules for the current time step and to process the feature vectors to generate a revision vector for the current time step, wherein the revision vector represents global information of the plurality of wrapped convolutional neural network layers;

the machine learning task is one of the following: a super resolution task, a depth estimation task, a style transfer task, an image classification task, an object recognition task, an optical character recognition (OCR) task, or a semantic segmentation task.

15. A computer-implemented method comprising:

performing the following operations at each of a plurality of time steps:

for each of a plurality of wrapped convolutional neural network layers of a neural network:

receiving, by the wrapped convolutional neural network layer, a layer input and processing the layer input to generate an initial output for the current time step, and receiving, by the wrapped convolutional neural network layer, the initial output and processing the initial output to generate a feature vector for the current time step, wherein the feature vector represents local information of the wrapped convolutional neural network layer; and receiving, by a summarization module of the neural network, the feature vectors generated for the current time step and processing the feature vectors to generate a revision vector for the current time step, wherein the revision vector represents global information of the plurality of wrapped convolutional neural network layers;

further comprising:

at each time step after a first time step in the plurality of time steps, performing the following operations for each of the plurality of wrapped convolutional neural network layers:

receiving an amendment module input for the current time step, the amendment module input comprising one or more of: (i) a previous revision vector generated by the summarization module for a previous time step, (ii) a previous feature vector generated by the wrapped convolutional neural network layer for the previous time step, or (iii) the feature vector generated by the wrapped convolutional neural network layer for the current time step, processing the amendment module input to generate a set of amendment parameters, and processing the initial output for the current time step based on the set of amendment parameters to generate a layer output for the wrapped convolutional neural network layer.

16. A computer-implemented method comprising:

performing the following operations at each of a plurality of time steps:

for each of a plurality of wrapped convolutional neural network layers of a neural network:

receiving, by the wrapped convolutional neural network layer, a layer input and processing the layer input to generate an initial output for the current time step, and receiving, by the wrapped convolutional neural network layer, the initial output and processing the initial output to generate a feature vector for the current time step, wherein the feature vector represents local information of the wrapped convolutional neural network layer; and receiving, by a summarization module of the neural network, the feature vectors generated for the current time step and processing the feature vectors to generate a revision vector for the current time step, wherein the revision vector represents global information of the plurality of wrapped convolutional neural network layers;

wherein the layer input is one of the following: (i) an input image of the neural network, (ii) an input derived from the input image, (iii) a layer output of a preceding wrapped convolutional neural network layer in the plurality of wrapped convolutional neural network layers, or (iv) an output of another component of the neural network.

17. One or more non-transitory computer storage media storing instructions that, when executed by one or more computers, cause the one or more computers to perform the following operations at each of a plurality of time steps:

for each of a plurality of wrapped convolutional neural network layers of a neural network:

receiving, by the wrapped convolutional neural network layer, a layer input and processing the layer input to generate an initial output for the current time step, and receiving, by the wrapped convolutional neural network layer, the initial output and processing the initial output to generate a feature vector for the current time step, wherein the feature vector represents local information of the wrapped convolutional neural network layer; and receiving, by a summarization module of the neural network, the feature vectors generated for the current time step and processing the feature vectors to generate a revision vector for the current time step, wherein the revision vector represents global information of the plurality of wrapped convolutional neural network layers;

at each time step after the first time step in the plurality of time steps, performing the following operations for each of the plurality of wrapped convolutional neural network layers:

receiving an amendment module input for the current time step, the amendment module input comprising one or more of: (i) a previous revision vector generated by the summarization module for a previous time step, (ii) a previous feature vector generated by the wrapped convolutional neural network layer for the previous time step, or (iii) the feature vector generated by the wrapped convolutional neural network layer for the current time step, processing the amendment module input to generate a set of amendment parameters, and processing the initial output for the current time step based on the set of amendment parameters to generate a layer output for the wrapped convolutional neural network layer.

\* \* \* \* \*